(12) United States Patent
Reichardt et al.

(10) Patent No.: US 11,881,885 B2
(45) Date of Patent: Jan. 23, 2024

(54) ANTENNA DEVICE FOR TRANSMITTING HIGH-FREQUENCY SIGNALS FROM OR TO A MOTOR VEHICLE, AND MOTOR VEHICLE COMPRISING AN ANTENNA DEVICE

(71) Applicant: Audi AG, Ingolstadt (DE)

(72) Inventors: Lars Reichardt, Wettstetten (DE); Stefan Volnhals, Adelschlag (DE)

(73) Assignee: AUDI AG, Ingolstadt (DE)

( * ) Notice: Subject to any disclaimer, the term of this patent is extended or adjusted under 35 U.S.C. 154(b) by 49 days.

(21) Appl. No.: 17/603,502

(22) PCT Filed: Mar. 20, 2020

(86) PCT No.: PCT/EP2020/057734
§ 371 (c)(1),
(2) Date: Oct. 13, 2021

(87) PCT Pub. No.: WO2020/212071
PCT Pub. Date: Oct. 22, 2020

(65) Prior Publication Data
US 2022/0216888 A1    Jul. 7, 2022

(30) Foreign Application Priority Data
Apr. 15, 2019 (DE) .................. 10 2019 205 406.4

(51) Int. Cl.
*H04B 1/3822* (2015.01)
*H04W 4/46* (2018.01)
(Continued)

(52) U.S. Cl.
CPC ............. *H04B 1/3822* (2013.01); *H01Q 1/32* (2013.01); *H04B 1/40* (2013.01); *H04W 4/46* (2018.02)

(58) Field of Classification Search
CPC ........ H04B 1/3822; H04B 1/40; H04B 17/21; H04B 1/0475; H04B 1/18; H04B 1/0458;
(Continued)

(56) References Cited

U.S. PATENT DOCUMENTS 5,737,687 A    4/1998  Martin et al.
6,141,375 A   10/2000  Ishida
(Continued)

FOREIGN PATENT DOCUMENTS

CN   1185246 A    6/1998
CN   1236227 A   11/1999
(Continued)

OTHER PUBLICATIONS

International Search Report and Written Opinion of the International Searching Authority directed to International Patent Application No. PCT/EP2020/057734, dated Jul. 8, 2020; 18 pages.

*Primary Examiner* — Golam Sorowar
(74) *Attorney, Agent, or Firm* — Sterne, Kessler, Goldstein Fox P.L.L.C.

(57) ABSTRACT

The application relates to an antenna device for transmitting high-frequency signals from or to a motor vehicle. The antenna device comprises a first radio module and a second radio module, which provide high-frequency signals for transmission via an antenna, and an antenna module comprising the antenna and a compensator. The antenna module is connected to the first radio module via a first antenna cable, and to the second radio module via a second antenna cable. The compensator is designed to modify a signal strength of the high-frequency signals in accordance with a control signal. The first radio module and the second radio module are designed to generate the control signal for controlling the compensator, wherein in order to control the compensator, the second radio module modulates the control (Continued)

signal for the first radio module onto the second antenna cable.

12 Claims, 1 Drawing Sheet

(51) Int. Cl.
*H01Q 1/32* (2006.01)
*H04B 1/40* (2015.01)

(58) Field of Classification Search
CPC . H04B 17/12; H04B 7/04; H04B 1/48; H04B 2001/0408; H04B 1/0007; H04B 1/3877; H04B 1/44; H04B 7/155; H04B 1/62; H04B 1/006; H04B 1/0064; H04B 1/38; H04B 10/25754; H04B 2001/0416; H04W 88/085; H04W 84/047; H04W 4/44; H04W 52/18; H04W 52/367; H04W 84/08; H04W 88/04; H04W 4/40; H04W 52/08; H04W 52/52; H04W 72/0453; H04W 88/06; H04W 16/28; H04W 24/02; H04W 4/30; H04W 4/48; H04W 48/18; H04W 52/16; H04W 56/004; H01Q 1/246; H01Q 1/32; H01Q 1/3275; H01Q 21/0025; H01Q 3/2605; H01Q 3/34; H01Q 9/0407; H01Q 21/08; H01Q 3/26; H01Q 1/2291; H01Q 1/242; H01Q 1/48; H01Q 3/24; H01Q 21/06; H01Q 21/061; H01Q 25/00; H01Q 7/00; H01Q 1/2283; H01Q 1/243; H01Q 1/3208
See application file for complete search history.

(56) References Cited

U.S. PATENT DOCUMENTS

| | | | |
|---|---|---|---|
| 8,488,623 B2 | 7/2013 | Duwel et al. | |
| 9,154,177 B2 | 10/2015 | Kim | |
| 9,191,903 B2 | 11/2015 | Sasson | |
| 9,491,713 B2 | 11/2016 | Dykyy et al. | |
| 9,596,656 B2 | 3/2017 | Suzuki et al. | |
| 9,966,645 B1 | 5/2018 | Papp et al. | |
| 10,021,652 B2 | 7/2018 | Gossner et al. | |
| 10,186,762 B2 | 1/2019 | Papp et al. | |
| 10,347,960 B2 | 7/2019 | Kikuchi et al. | |
| 10,581,477 B2 | 3/2020 | Langbein et al. | |
| 10,812,128 B2 | 10/2020 | Spehl et al. | |
| 10,868,575 B2 | 12/2020 | Stahlin et al. | |
| 11,122,519 B1* | 9/2021 | Ichapurapu | H04W 52/20 |
| 2013/0136196 A1* | 5/2013 | Rousu | H04M 1/6075 |
| | | | 375/259 |
| 2014/0148214 A1 | 5/2014 | Sasson | |
| 2017/0324431 A1* | 11/2017 | Solan | H03G 3/3036 |
| 2019/0104488 A1* | 4/2019 | Tawadrous | H04W 4/44 |
| 2022/0255572 A1* | 8/2022 | Huo | H04B 1/16 |

FOREIGN PATENT DOCUMENTS

| | | |
|---|---|---|
| CN | 2653788 Y | 11/2004 |
| CN | 101064522 A | 10/2007 |
| CN | 101640562 A | 2/2010 |
| CN | 102267480 A | 12/2011 |
| CN | 102267487 A | 12/2011 |
| CN | 102461007 A | 5/2012 |
| CN | 102611472 A | 7/2012 |
| CN | 103222234 A | 7/2013 |
| CN | 203632629 U | 6/2014 |
| CN | 104868938 A | 8/2015 |
| CN | 106465083 A | 2/2017 |
| CN | 108430837 A | 8/2018 |
| DE | 102014209910 A1 | 12/2014 |
| DE | 102014215578 A1 | 2/2016 |
| DE | 102015220297 A1 | 4/2016 |
| DE | 102015211413 A1 | 12/2016 |
| DE | 102016214855 A1 | 2/2018 |
| DE | 102017202341 A1 | 8/2018 |
| EP | 0 823 751 A2 | 2/1998 |
| EP | 1039650 A2 | 9/2000 |

* cited by examiner

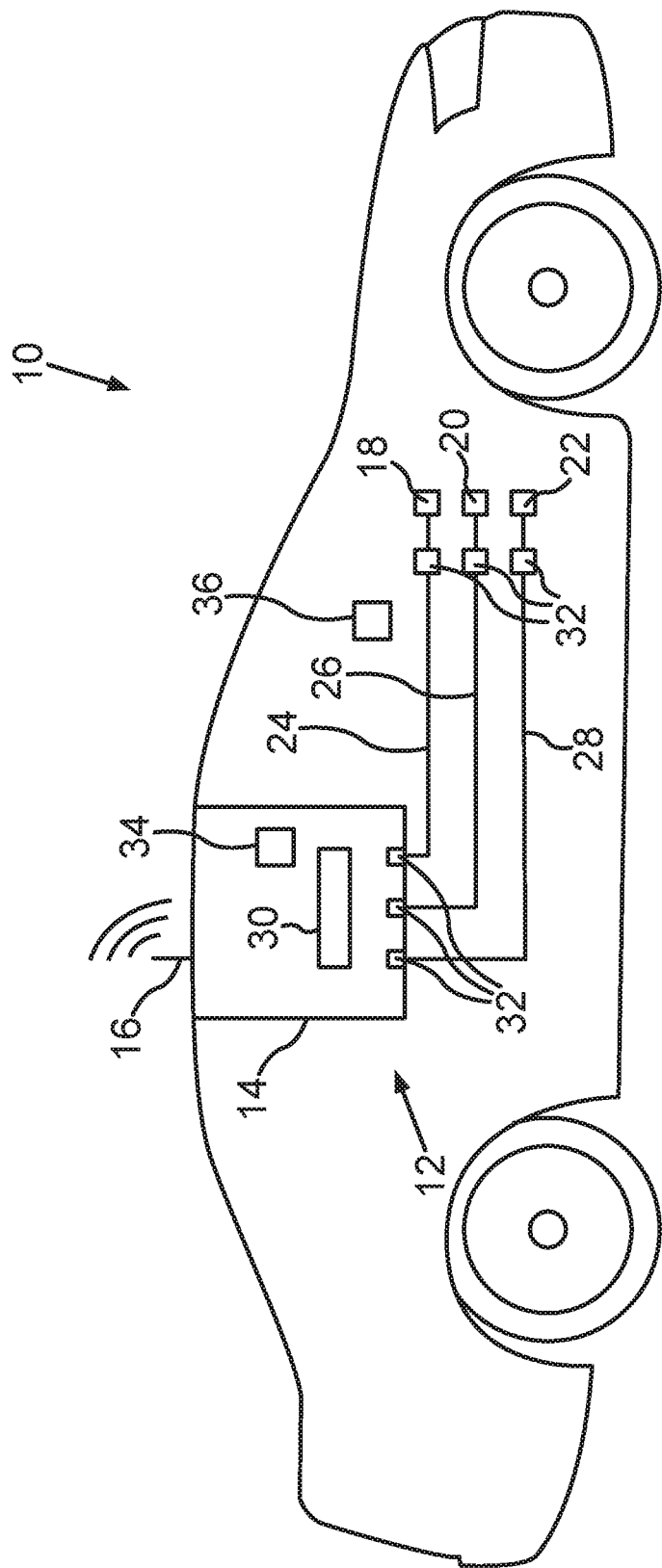

ANTENNA DEVICE FOR TRANSMITTING HIGH-FREQUENCY SIGNALS FROM OR TO A MOTOR VEHICLE, AND MOTOR VEHICLE COMPRISING AN ANTENNA DEVICE

TECHNICAL FIELD

The application relates to an antenna device for transmitting high-frequency signals from or to a motor vehicle and to a motor vehicle comprising such an antenna device.

BACKGROUND

In a motor vehicle, services that use high-frequency signals, such as vehicle-to-vehicle or vehicle-to-infrastructure services, which transmit in a range from 5 to 6 gigahertz, are becoming increasingly important. Because the typically installed cables, especially coaxial cables, have high attenuation in this frequency range and a front end, i.e. a radio module for a service in the motor vehicle is connected to the associated antenna over several meters of cable, a compensator on the antenna in an antenna module is necessary to ensure sufficient performance of the antenna device.

The compensator can differentiate between a transmission and reception mode of the connected radio module and can amplify or weaken the high-frequency signals accordingly. For this purpose, a control signal for controlling the compensator is necessary in order to switch between a setting, such as, for example, an amplification or an attenuation, of a relevant radio module.

From DE 10 2015 220 297 A1 an antenna device and a method for operating such is known. The antenna device has an antenna, the antenna being connected to an electronic device via an antenna cable and high-frequency signals being transmitted via the antenna cable between the electronic device and the antenna and vice versa. The antenna device has a control unit and switching units which are controlled by the control unit, the switching units being used to switch between a reception path and a transmission path between the electronic device and the antenna.

DE 10 2017 202 341 A1 discloses a compensator for compensating for power or coupling losses in a signal transmission path for the transmission of a communication signal between an antenna and an electronic control unit.

A compensator module is known from DE 10 2014 215 578 A1 which can be connected to a transceiver unit by means of an antenna cable, the compensator module being designed to determine an output transmission power and to generate therefrom a characteristic value, which represents the output transmission power and/or the difference between output transmission power and transmission power, and the compensator module having a data interface to transmit the characteristic value via the antenna cable to the transceiver unit during operation.

From U.S. Pat. No. 10,021,652 B2 a remote antenna system is known which has a bidirectional control path with a transmission circuit and a receiver circuit.

From US 2014/0 148 214 A1 an apparatus and method for the efficient external control of a transmission strength of a remote antenna with fixed gain is known.

BRIEF DESCRIPTION OF THE DRAWINGS/FIGURES

FIG. 1 is a schematic representation of a motor vehicle according to one exemplary embodiment.

DETAILED DESCRIPTION

The object of the present application is to provide an antenna device for transmitting high-frequency signals for a plurality of radio modules, that is to say a plurality of high-frequency services.

The object is achieved by the subject matter of the independent claims. Advantageous developments of the application are disclosed by the dependent claims, the subsequent description, and the included drawings.

The application is based on the knowledge that, in an antenna device having a plurality of radio modules, a control signal for a compensator for attenuating or amplifying a high-frequency signal of a first radio module is modulated onto an antenna cable of a second radio module. The modulation of the control signal onto the high-frequency signal of the first radio module can help minimize any influence of the control signal on the high-frequency signal.

The application provides an antenna device for transmitting high-frequency signals, in a range of 5-6 gigahertz, from or to a motor vehicle, for example for vehicle-to-vehicle or vehicle-to-infrastructure-services. The antenna device comprises a first radio module and a second radio module, which are designed to provide high-frequency signals for transmission via an antenna. The first radio module can include a data transmission service, such as a service in accordance with the 5G standard, for vehicle-to-vehicle communication, and the second radio module can be provided for GPS communication, for example.

Furthermore, the antenna device comprises an antenna module which includes the antenna for transmitting the high-frequency signals and a compensator. The antenna module can be connected to the first radio module via a first antenna cable and to the second radio module via a second antenna cable. The antenna cable can be designed to forward the high-frequency signals between the antenna module and the corresponding radio module and vice versa. The antenna cable that connects the corresponding radio module to the antenna module can be a coaxial cable with a length of greater than or equal to one meter.

The compensator can be designed to modify a signal strength of the high-frequency signals in accordance with a control signal. The first radio module and the second radio module can be designed to generate the control signal for controlling the compensator, wherein in order to control the compensator, the second radio module can be designed to modulate the control signal for the first radio module onto the second antenna cable.

At least two radio modules can be provided for an antenna device for transmitting high-frequency signals. The at least two radio modules can transmit the high-frequency signals to an antenna module via a corresponding antenna cable. The high-frequency signals in the antenna module can be modified by a compensator in accordance with a control signal and the control signal can be modulated onto the antenna cable of the corresponding radio module to control the compensator. The modulation of the control signals for controlling the compensator can be carried out using known modulation methods amplitude modulation, frequency modulation, phase modulation and/or pulse code modulation, for example. The antenna module and the antenna can in particular have a multi-antenna system architecture, which can combine different radio modules in one antenna.

The application has the advantage that the control signals required for the compensator, depending on compatibility, can be modulated onto the antenna cable corresponding to another radio module and not onto the radio module that is generating the high-frequency signals. Using the antenna cable corresponding to another radio module can prevent the high frequency signals from being influenced by the control signal. In particular, a frequency difference between the high-frequency signals and the control signal can preferably be taken into account here. In other words, the advantage lies in the separation or decoupling of the control signals from the coaxial cable used for the transmission. A coaxial cable from another radio module can be used for control. As a result, expensive coaxial cables and the associated expensive plug connections can be spared. Furthermore, a smaller number of coaxial plug connections can spare time in production.

The application also includes further embodiments, which offer additional advantages.

In accordance with some embodiments, the first radio module is designed to modulate the control signal for the second radio module onto the first antenna cable. This has the advantage that the radio modules can each generate the control signals for the respective other radio module.

The first radio module and the second radio module can in particular include a navigation service such as a global navigation satellite system (GNSS). The GNSS can be GPS, GLONAS, Galileo or Beidou, a cellular service such as GMS, UMTS or LTE, a broadcast service such as AM-FM, DAB and/or a data transmission service such as WLAN, BTLE, Car-to-Car or Car-to-X.

In accordance with some embodiments, modifying the signal strength of the high-frequency signals can include amplifying and/or attenuating the signal level. Modifying the signal strength of the high-frequency signals has the advantage that the high-frequency signal for transmission via the antenna cable can be amplified by the compensator and/or the signal level can be attenuated if the signal strength is too high.

In accordance with some embodiments, the antenna module also has a switching unit which can be designed to switch between a transmission path and a reception path of the high-frequency signals for the corresponding radio module in accordance with the control signal. The switching unit can, for example, activate a switch depending on the control signal, which can switch the high-frequency signals either on a reception path or on a transmission path. This embodiment has the advantage that transmission and reception for a radio module can be carried out via the same antenna cable.

In accordance with some embodiments, at least a third radio module can also be provided with a third antenna cable, which can also generate high-frequency signals and a control signal. For example, the first and second radio modules can be designed to modulate the control signal for the third radio module onto the first and/or second antenna cables. In other words, more than two radio modules can be provided, that is to say, for example, additionally a third radio module, wherein the control signal of the third radio module can be modulated from the first and/or second radio module onto the corresponding antenna cable. Which of the radio modules modulates the control signal of the third radio module can, for example, be determined in advance, but it can also be decided dynamically for each control signal which radio module is generating the control signal. This embodiment has the advantage that a plurality of radio modules can be provided in the antenna device.

In accordance with some embodiments, the second radio module can also be designed to bundle the control signals of the first and third radio modules and to modulate them onto the second antenna cable. Bundling means that the second radio module can receive a request to transmit the control signals of the first and third radio modules and can then modulate these control signals onto the second antenna cable in a multiplexing method. Known multiplexing methods can be used here such as, for example, a space division multiplexing method, frequency or wavelength division multiplexing method, a time division multiplexing method or a code division multiplexing method. This embodiment has the advantage that the control signals can be sent simultaneously via one antenna cable, whereby the transmission of control signals on a plurality of antenna cables can be reduced.

A further embodiment provides that the antenna device further comprises a signal path control device, the signal path control device can be designed to check which radio module is not transmitting any high-frequency signals, and to transmit the control signal of the corresponding radio module via the antenna cable of the radio module which is not transmitting any high-frequency signals. In other words, a signal path control device can check which of the radio modules is currently not transmitting any high-frequency signals, that is to say which, for example, is not in operation, and then transmit the control signal via this radio module. This has the advantage that an impairment of the control signal with the high-frequency signals can be avoided.

In accordance with some embodiments, the signal path control device can be designed to check which radio module is switched to a transmission path and to transmit the control signal via the antenna cable of the radio module that is switched to the transmission path. In other words, the control signal is transmitted via the antenna cable or the radio module which is already in a transmission setting, that is to say, it is switched to the transmission path that is in a direction from the radio module to the antenna module. This embodiment has the advantage that received high-frequency signals can be prevented from adversely affecting the transmission of the control signal.

According to the application, a motor vehicle having an antenna device according to any of the preceding embodiments is also provided. This results in the same advantages and possible variations as with the antenna device. The motor vehicle according to the application is preferably designed as a car, in particular as a passenger car or truck or as a passenger bus or motorcycle.

The application also comprises the combinations of the features of the described embodiments.

The embodiments explained below are preferred embodiments of the application. In the embodiments, the described components of the embodiments each represent individual features of the application, each of which is to be considered to be independent of one another and each of which further develops the application independently of one another. Therefore, the disclosure shall also comprise other combinations of the features of the embodiments than the ones presented. Furthermore, the described embodiments may also be supplemented by further features of the application as already described.

The single FIGURE shows a schematic representation of a motor vehicle 10 with an antenna device 12 according to an exemplary embodiment. In this embodiment, the motor vehicle 10 can be a passenger car. The antenna device 12 can have an antenna module 14, which can include an antenna 16, which can be, for example, a roof antenna of the motor vehicle. The antenna 16 can, however, also be a front antenna of the motor vehicle. The antenna 16 can preferably be designed to transmit high-frequency signals of a plurality of high-frequency services.

Each of the high-frequency services can, for example, have its own radio module; in particular, a first radio module 18, a second radio module 20 and a third radio module 22 can be provided. The first radio module 18 can, for example, comprise a data transmission service such as WLAN, the second radio module a navigation service such as GPS and the third radio module a cellular service such as LTE. Alternatively or additionally, however, alternative or further services can also be provided. In particular, the first to third radio modules 18, 20, 22 can be designed to provide high-frequency signals for transmission via the antenna 16. In this embodiment, the radio modules 18, 20, 22 can be located, for example, in a vehicle computer of an infotainment system.

To transmit the high-frequency signals, the first radio module 18 can have a first antenna cable 24, the second radio module 20 a second antenna cable 26, and the third radio module 22 a third antenna cable 28. The corresponding antenna cables 24, 26, 28 can preferably be coaxial cables that can transmit the high-frequency signals over a distance of, for example, over one meter. In this case, however, in particular for high-frequency signals in a frequency range of 5 to 6 gigahertz, attenuation can occur within the antenna cables 24, 26, 28, which can be compensated in the antenna module 14 by a compensator 30, i.e. a signal strength of the high-frequency signals can be modified. In particular, modifying the signal strength of the high-frequency signals can include amplifying and/or attenuating the signal level.

In order for the compensator 30 to be able modify the high-frequency signals of the radio modules 18, 20, 22 accordingly, the compensator 30 can receive a control signal that can be generated by one of the radio modules 18, 20, 22. In particular, it can be provided that when the high-frequency signals are transmitted from the first radio module 18 via the first antenna cable 24, the first radio module 18 activates the second radio module 20, so that the second radio module 20 generates the control signal for controlling the compensator for the first radio module 18 and modulates it onto the second antenna cable 26. This has the advantage that any impairments of the high-frequency signal of the first radio module can be reduced. In particular, a transmission table can be provided in which it is specified which radio module is generating the corresponding control signal for another radio module.

The modulation of the control signal onto the corresponding antenna cable can be carried out, for example, by means of known modulation methods; in particular, each radio module can have a pair of diplexers 32 that can modulate the control signal onto the antenna cable together with the high-frequency signals or separate them. The antenna module 14 can also have a switching unit 34 which can switch between a transmission path and a reception path of the high-frequency signals for the corresponding radio module in accordance with the control signal. In particular, the switching unit 34, together with the compensator 30, can amplify the signal strength of the high-frequency signals in accordance with reception, or attenuate it before transmission.

In addition to the transmission table, a signal path control device 36 can be provided which can check which radio module is not transmitting high-frequency signals and can then transmit the control signal via the radio module which is currently not transmitting high-frequency signals, thereby reducing the control signal's impairment of the high-frequency signals.

In an exemplary situation, for example, the first radio module 18 and the third radio module 22 can transmit a high-frequency signal. A check by the signal path control device 36 can then show that the second radio module 20 is currently not transmitting a high-frequency signal, whereupon the second radio module 20 can generate the control signal and transmit it to the compensator 30 and/or the switching unit 34 via the second antenna cable 26. In this example, the second radio module 20 can preferably also bundle the control signals for the first and third radio modules 18, 22 by means of a multiplexing method before they are modulated onto the second antenna cable. Control signals for a plurality of radio modules can thus be modulated onto just one antenna cable for activating the compensator 30.

In addition, the signal path control device 36 can check which radio module is already in a transmission setting, i.e. which radio module is switched to a transmission path, and then preferably to transmit the control signal via the antenna cable of the radio module which is in the transmission setting. For example, the first radio module 18 can again transmit or receive a high-frequency signal for which a control signal for the compensator 30 is to be generated. The signal path control device 36 can then check whether the second radio module 20 or the third radio module 22 is already in a transmission setting. In this exemplary situation, it may be that the second radio module 20 has just sent high-frequency signals and the third radio module 22 has just received high-frequency signals. The second radio module 20 is therefore in a transmission setting, that is, it is already switched in the transmission direction, as a result of which the signal path control device 36 can trigger the second radio module 20 to generate the control signal for the first radio module 18.

Overall, the examples show how the application can provide control of a compensator via a high-frequency antenna cable of any service (radio module) in an antenna module.

The invention claimed is:

1. An antenna device for transmitting high-frequency signals from or to a motor vehicle, the antenna device comprising:
   a first radio module and a second radio module, each configured to provide the high-frequency signals for transmission via an antenna;
   an antenna module comprising the antenna for transmitting the high-frequency signals and a compensator, wherein the antenna module is coupled to the first radio module via a first antenna cable, and to the second radio module via a second antenna cable, and wherein:
   the first antenna cable is configured to transmit a first high-frequency signal between the first radio module and the first antenna module;
   the second antenna cable is configured to transmit a second high-frequency signal between the second radio module and the second antenna module;
   the compensator being configured to modify a signal strength of the high-frequency signal and the second high-frequency signal in accordance with a first control signal and a second control signal respectively;
   the first radio module is configured to generate the first control signal and the second radio module is configured to generate the second control signal for controlling the compensator; and
   the second radio module is configured to modulate the first control signal for the first radio module for controlling the compensator onto the second antenna cable.

2. The antenna device in claim 1, wherein the first radio module is configured to modulate the second control signal for the second radio module onto the first antenna cable.

3. The antenna device in claim 1, wherein the first radio module and the second radio module each comprise a navigation service, a mobile radio service, a broadcast service and/or a data transmission service.

4. The antenna device in claim 1, wherein the compensator is further configured to modify the signal strength of the first high-frequency signal and the second high-frequency signal by at least one of amplifying or attenuating the signal strength.

5. The antenna device in claim 1, wherein the antenna module further comprises a switching unit that is configured to switch between a transmission path and a reception path of the high-frequency signals for the corresponding radio module in accordance with the first control signal or the second control signal.

6. The antenna device in claim 1, further comprising a third radio module with a third antenna cable, wherein the first and second radio modules are further configured to modulate a third control signal for the third radio module onto at least one of the first or the second antenna cables.

7. The antenna device in claim 6, wherein the second radio module is further configured to modulate the first control signal of the first radio module and the third control signal of the third radio module onto the second antenna cable.

8. The antenna device in claim 1, wherein the antenna device further comprises a signal path control device, wherein the signal path control device is configured to check which of the first or second radio module is not transmitting any high-frequency signals, and to transmit the first or second control signal of the corresponding first or second radio module via the first or second antenna cable of the first or second radio module which is not transmitting any high-frequency signals.

9. The antenna device in claim 8, wherein the signal path control device is further configured to check which of the first or second radio module is switched to a first or second transmission path and to transmit the first or second control signal via the first or second antenna cable of the first or second radio module which is switched to the transmission path.

10. The antenna device in claim 1, wherein the second radio module further comprises a diplexer configured to modulate the first control signal and the high-frequency signals onto the second antenna cable together or separate them.

11. The antenna device in claim 2, wherein the first radio module further comprises a diplexer configured to modulate the second control signal and the high-frequency signals onto the first antenna cable together or to separate them.

12. A motor vehicle comprising an antenna device for transmitting high-frequency signals from or to the motor vehicle, the antenna device comprising:
 a first radio module and a second radio module, each configured to provide the high-frequency signals for transmission via an antenna;
 an antenna module comprising the antenna for transmitting the high-frequency signals and a compensator, wherein the antenna module is coupled to the first radio module via a first antenna cable, and to the second radio module via a second antenna cable, and wherein;
 the first antenna cable is configured to transmit a first high-frequency signal between the first radio module and the first antenna module;
 the second antenna cable is configured to transmit a second high-frequency signal between the second radio module and the second antenna module;
 the compensator being configured to modify a signal strength of the first high-frequency signal and the second high-frequency signal in accordance with a first control signal and a second control signal;
 the first radio module is configured to generate the first control signal and the second radio module is configured to generate the second control signal for controlling the compensator; and
 the second radio module is configured to modulate the first control signal for the first radio module for controlling the compensator onto the second antenna cable.

* * * * *